United States Patent
Lin et al.

(10) Patent No.: US 7,389,042 B2
(45) Date of Patent: Jun. 17, 2008

(54) AUTO FOCUS METHOD FOR DIGITAL CAMERA

(75) Inventors: Chin-Chih Lin, Taipei (TW);
Jui-Hsiang Lo, Taipei (TW);
Chiou-Shann Fuh, Shulin (TW);
Chia-Hao Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 419 days.

(21) Appl. No.: 11/302,710

(22) Filed: Dec. 14, 2005

(65) Prior Publication Data

US 2007/0110425 A1 May 17, 2007

(30) Foreign Application Priority Data

Nov. 11, 2005 (TW) .................................. 94139557

(51) Int. Cl.
*G03B 13/36* (2006.01)

(52) U.S. Cl. ........................ 396/127; 396/133; 348/349

(58) Field of Classification Search ................. 396/125, 396/126, 127, 133; 348/345, 349, 353–356
See application file for complete search history.

(56) References Cited

U.S. PATENT DOCUMENTS

| | | | | |
|---|---|---|---|---|
| 4,473,743 A | * | 9/1984 | Ishikawa | 250/204 |
| 5,249,058 A | * | 9/1993 | Murata et al. | 348/354 |
| 5,319,462 A | * | 6/1994 | Haruki et al. | 348/347 |
| 5,715,483 A | * | 2/1998 | Omata et al. | 396/80 |

* cited by examiner

*Primary Examiner*—W. B. Perkey
(74) *Attorney, Agent, or Firm*—Apex Juris, pllc; Tracey M Heims (57) ABSTRACT

An auto focus method of a digital camera for moving a lens of the digital camera to the maximum focus value position is provided. According to certain criteria, the lens movement states are categorized into four states, i.e. an initial state, a coarse state, a mid state and a fine state. The numbers of search steps for the lens in different states are different.

14 Claims, 9 Drawing Sheets

AUTO FOCUS METHOD FOR DIGITAL CAMERA

FIELD OF THE INVENTION

The present invention relates to an auto focus method for use with a digital camera, and more particularly to an auto focus method for use with a digital camera by finding the right position with the maximum focus value.

BACKGROUND OF THE INVENTION

Currently, digital cameras are widely used to take photographs. As known, the definition of the object taken by a digital camera is largely effected by the focusing operation of the digital camera. In order to achieve high image quality of the object, the focal length should be properly adjusted to focus on the object. In other words, the quality of the digital camera is dependent on the auto focus method applied to the digital camera.

Generally, auto focus methods are classified into two types, i.e. an active auto focus method and a passive auto focus method.

For implementing the active auto focus method, light patterns are projected onto the object to be photographed by using an infrared emitter or a laser emitter, and then the distance between the object and the camera is calculated by triangulation or according to the time difference from the beam projection to reception. Afterwards, the lens of the digital camera is adjusted to a proper position according to the distance. However, this active auto focus method has several drawbacks. For example, the cost of the digital camera is increased because extra detector and beam projector are needed.

The steps for implementing the passive auto focus method are illustrated with reference of the flowchart of FIG. 1. Unlike the active auto method, the passive auto focus method determines the distance between the object and the camera without projecting any light pattern onto the object. Afterwards, the lens of the digital camera is moved to multiple possible positions and the image qualities at different positions are analyzed in order to determine an accurate lens position. Firstly, the lens of the camera is moved to a first position and the image data at this position is captured (Step 100). Then, the focus value of the image is calculated (Step 200). If this focus value is the maximum focus value (Step 300), the auto focus (AF) process is finished. Otherwise, the lens is moved to the next position (Step 400), and the steps 200, 300 and 400 are repeated until the maximum focus value is searched.

Figure 1:
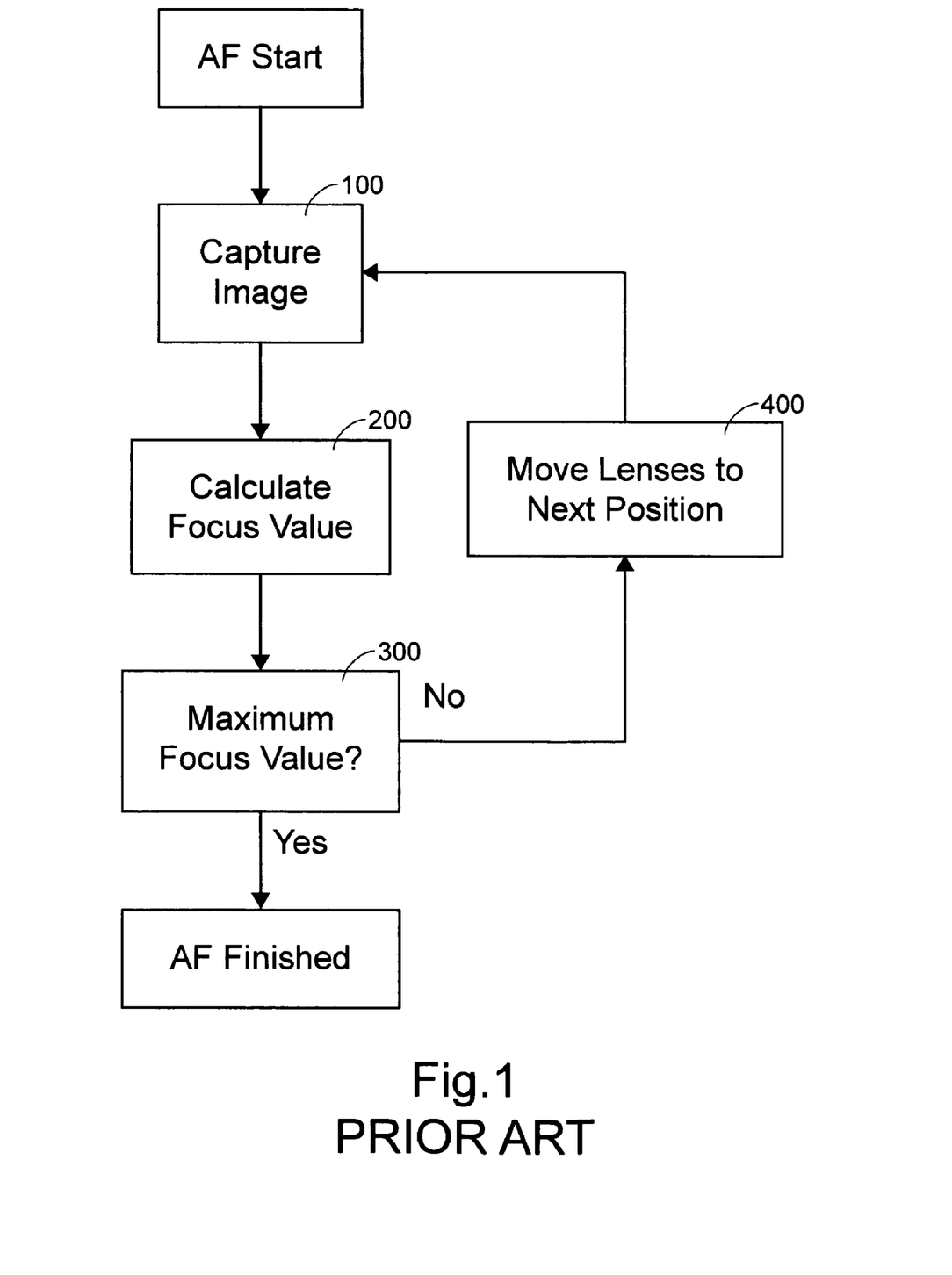
FIG. 1 is a flowchart illustrating the steps of a passive auto focus method.

From the flowchart of FIG. 1, the passive auto focus method includes two parts, i.e. the focus value measurement and the lens position search algorithm.

Conventionally, there are several means for implementing focus value measurements such as gradient magnitude measurement, Robert edge detector, Sobel edge detector, Laplacian filter, infinite impulse response (IIR) filter, etc. These focus value measurements are well known to those skilled in the art, and are not intended to describe redundantly herein.

The conventional lens position search algorithms include for example global search algorithm, hill-climbing search algorithm, binary search algorithm and ruled-based search algorithm.

Typically, search time, number of the lens movement steps and search accuracy are all very important for the lens position search algorithm. Generally, longer search time means lower auto focus efficiency, and more lens movement steps consume more power of the camera because each movement step needs power. Whereas, too short search time or insufficient movement steps are detrimental to the searching accuracy. These lens position search algorithms have respective advantages or drawbacks. Consequently, the designer may select one of these lens position search algorithms according to the practical requirement.

For example, since the global search algorithm captures image in every lens movement step and determines the position with the maximum focus value, the search result of the global search algorithm is the most correct among these lens position search algorithms. However, the global search algorithm needs too long search time and too many lens movement steps. In addition, the binary search algorithm is faster than global search algorithm but is more prone to be affected by noise. Moreover, the lens needs to move back and forth to obtain the peak position, which might suffer from mechanical backlash problem.

The ruled-based search algorithm determines the search steps for each lens movement step according to certain rules and then records the focus value of the lens at each position. Since the rules allow the assembler to capture acceptable image data of the lens without measuring the focus value for each lens movement step, the search time for implementing the ruled-based search algorithm is shortened. The search rules are shown as follows.

---

IF $C_{Iteration} \leq 5$ THEN $A_{Control}$ = Initial
ELSE
    IF $F_{Current} \leq 0.25 \cdot F_{Max}$, THEN $A_{Control}$ = Coarse;
    $C_{Down} = 0$;
    ELSE
        $D_F = F_{Current} - F_{Previous}$
        IF $D_F > 0.25 \cdot F_{Previous}$, THEN $A_{Control}$ = Fine;
        $C_{Down} = 0$;
        ELSE IF $A_{Control}$ = Fine AND $D_F > 0$, THEN
            $C_{Down} = 0$;
        ELSE IF $D_F < 0$
            IF $A_{Control}$ = Fine, THEN $C_{Down}$ + +;
            IF $C_{Down} = 3$, THEN $A_{Control}$ = Mid; $C_{Down} = 0$;
        ELSE
            $A_{Control}$ = Mid; $C_{Down} = 0$;
        END IF
    END IF
END IF
UPDATE $F_{Max}$;
$F_{Previous} = F_{Current}$;

---

In the above rules, $F_{Current}$ is sharpness value from current image data, $F_{Previous}$ is sharpness value from previous image data, $F_{Max}$ is maximum sharpness value, $C_{Iteration}$ is iteration counter, $A_{Contro}$ is control area, and $C_{Down}$ is downhill counter.

In views of the above-described disadvantages resulted from the prior art, the applicant keeps on carving unflaggingly to develop an auto focus method for use with a digital camera according to the present invention through wholehearted experience and research.

SUMMARY OF THE INVENTION

It is an object of the present invention to provide an auto focus method for searching the right position of the lens corresponding to the maximum focus value according to several criteria, thereby reducing the search time and achieving good image quality.

It is another object of the present invention to provide an auto focus method of a digital camera in order to achieve quick and correct focusing results.

In accordance with a first aspect of the present invention, there is provided an auto focus method of a digital camera for moving a lens of the digital camera to the maximum focus value position, comprising steps of: (a) calculating a focus value average $FV_{avg}$ of the focus values from the first step position to the Nth step position of the lens; (b) determining a lens movement state including a coarse state, a mid state and a fine state, wherein the lens moves A steps in the coarse state, B steps in the mid state and one step in the fine state, where B is less than A; (c) moving the lens and recording the focus value of the lens in the lens movement state according to the focus value average $FV_{avg}$, a focus value difference $FV_{dif}$, a previous maximum focus value $FV_{max}$, a coarse state threshold $T_c$, a mid state threshold $T_m$, a focus value difference threshold $T_{dif}$, a mid state count value MidCount and a downhill count value DownCount; (d) repeating steps (b) and (c) until the searching over a search range is finished; and (e) moving the lens to a right position corresponding to the maximum focus value.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
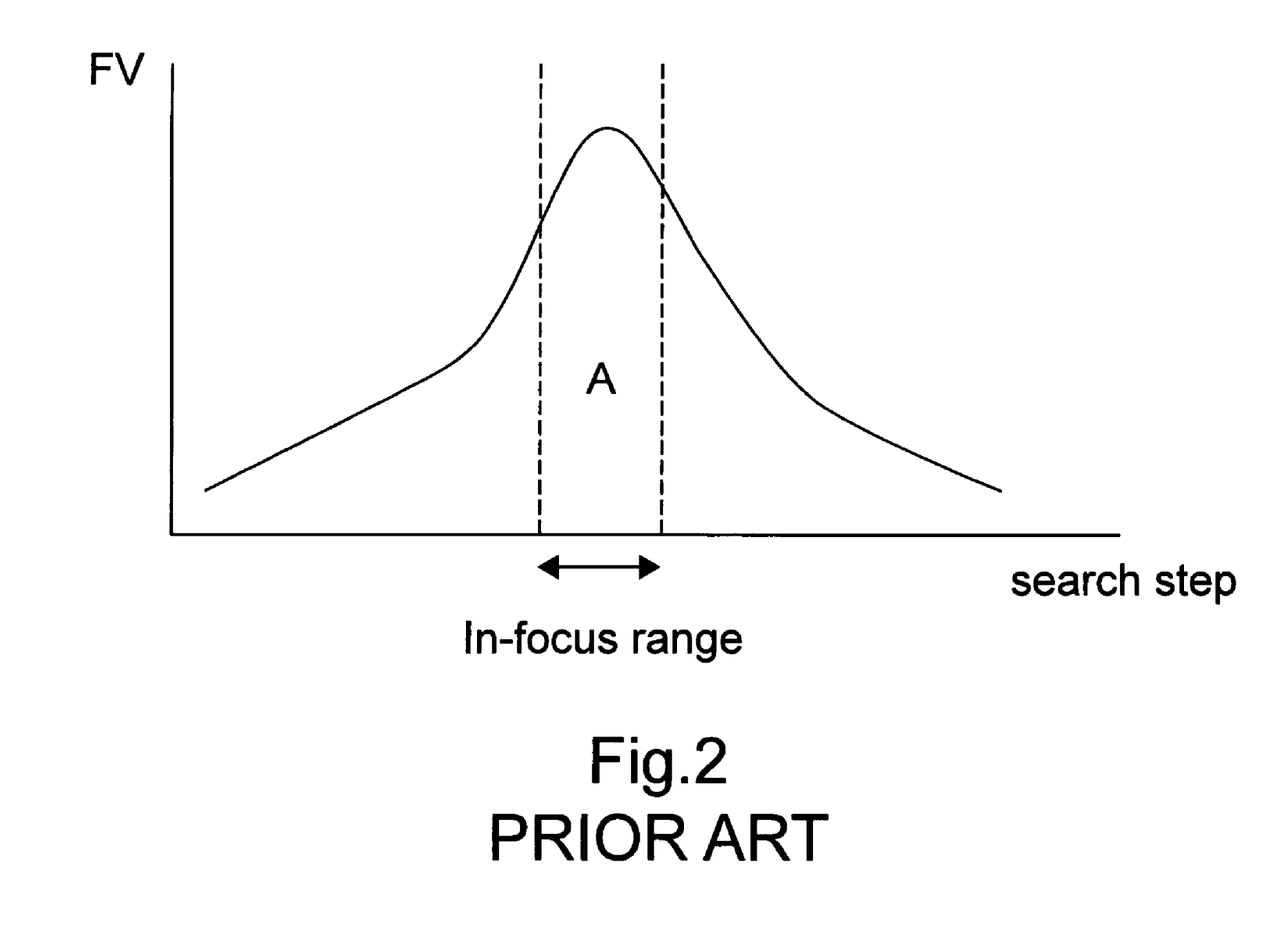
FIG. 2 is a typical curve plot illustrating the relation between lens search steps versus focus values.

FIG. 2 is a typical curve plot illustrating the relation between lens search steps versus focus values. The principal object of the present invention is to find out the lens position having the maximum focus value, i.e. the peak value. Nevertheless, the focus values within the in-focus range, i.e. zone A, are acceptable.

For a purpose of reducing the search time, the lens movement states are categorized into four states according to certain criteria and the numbers of search steps in different states are different.

According to the present invention, the lens movement state includes an initial state, a coarse state, a mid state and a fine state.

In the initial state, the average of the focus values from the first step position to the fifth step position is used as a criterion for determining next state and initializes all variables.

In the coarse state, the focus values are stable and the FV curve is flat. As shown in FIG. 2, the existence of global peak is almost impossible in this state. Therefore, each focal value measurement is done when the lens moves 8~12 steps in the coarse state.

In the mid state, the focus values change more and the FV curve might have the local peak. The local peak might be the global peak. In order to save search time and not lose the information in this state, each focal value measurement is done when the lens moves 3~5 steps in the mid state.

In the fine state, the FV curve goes up or down sharply and the possibility of containing global peak is very high. For achieving the maximum focus value, each focus value measurement is done when the lens moves 1 step in the fine state.

Figure 3A:
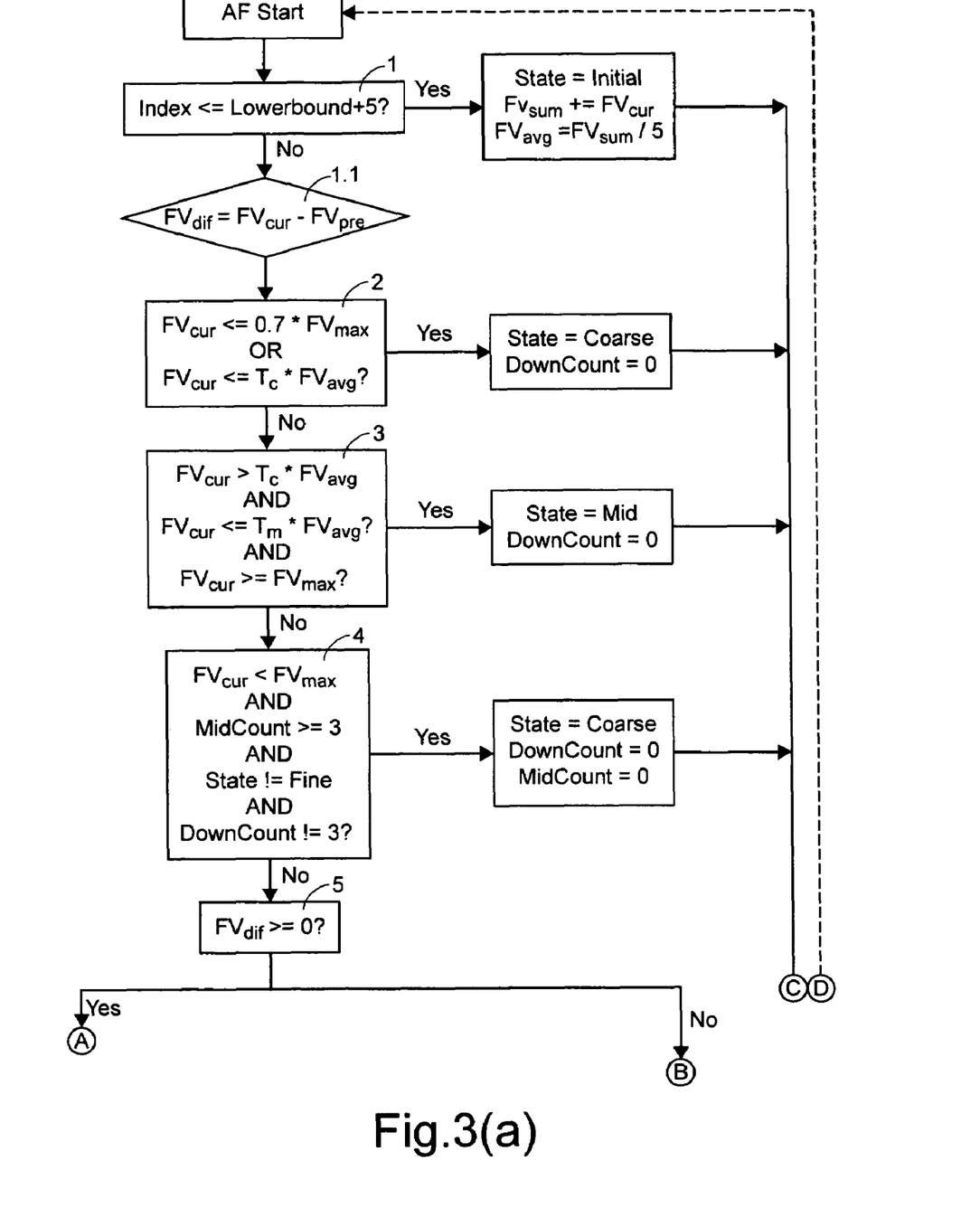
FIGS. 3(a) and 3(b) are flowcharts illustrating the steps of an auto focus method according to a preferred embodiment of the present invention.
Figure 3B:
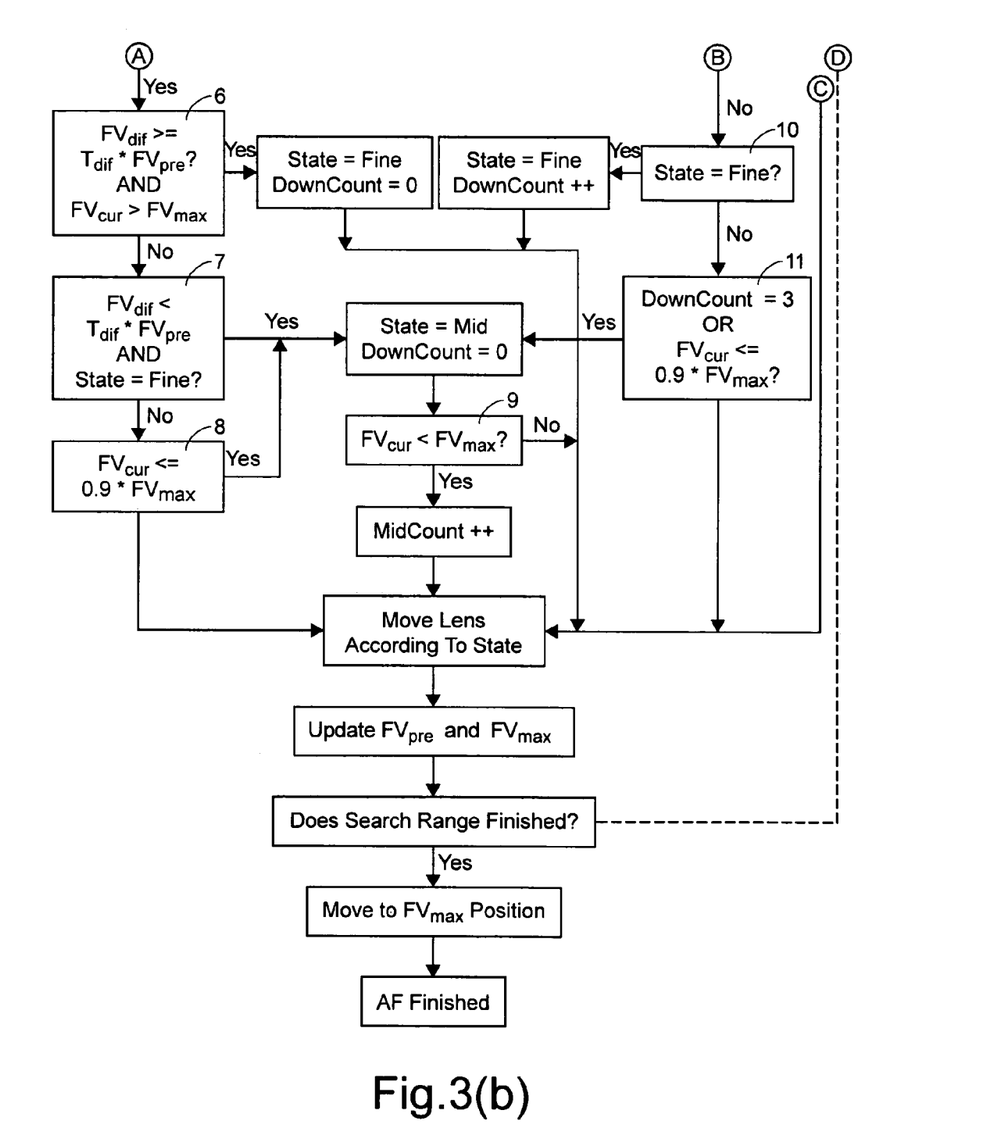

The criteria for discriminating the lens movement states according to the auto focus method of the present invention are illustrated with reference of the flowchart of FIG. 3.

After the auto focus starts, the first criterion (Criterion 1) is used to judge whether the search position is the first five steps. If the first criterion is satisfied, the lens movement state enters the initial state. In the initial state, the average $FV_{avg}$ of the focus values from the first step position to the fifth step position is calculated.

Afterwards, a focus value difference $FV_{dif}$, which is the difference between the current focus value $FV_{cur}$ and the previous focus value $FV_{pre}$, is calculated (Criterion 1.1).

The previous maximum focus value $FV_{max}$ is also recorded and updated and thus the previous maximum focus value $FV_{max}$ is varied.

Moreover, a coarse state threshold $T_c$, a mid state threshold $T_m$, a focus value difference threshold $T_{dif}$, a mid state count value MidCount and a downhill count value DownCount are used to determine the states of the lens movement state.

When the focus value difference $FV_{dif}$ is smaller than zero in the fine state, the downhill count value DownCount should add one. If the lens is not in the fine state, the downhill count value DownCount should be set to zero. When the current focus value $FV_{cur}$ is smaller than previous maximum focus value $FV_{max}$ in the mid state, mid state count value MidCount should add one.

In a preferred embodiment, the coarse state threshold $T_c$ is ranged between 1.05 and 1.15, the mid state threshold $T_m$ is ranged between 1.1 and 1.2, and the focus value difference threshold $T_{dif}$ is ranged between 0.015 and 0.025.

The second criterion (Criterion 2) discriminates if $FV_{cur} < T_c \times FV_{avg}$ or $FV_{cur} < 0.7 \times FV_{max}$. If the second criterion is satisfied, the focus value is small enough to be in the coarse state, and the downhill count value DownCount is set to zero. Otherwise, the next criterion is taken into consideration.

The third criterion (Criterion 3) discriminates if $T_c \times FV_{avg} < FV_{cur} < T_m \times FV_{avg}$ and $FV_{cur} > FV_{max}$. If the third criterion is satisfied, the lens movement state is in the mid state, and the downhill count value DownCount is set to zero. Otherwise, the next criterion is taken into consideration.

The fourth criterion (Criterion 4) discriminates if $FV_{cur} < FV_{max}$, MidCount>3, DownCount is not equal to 3, and the current state is not the fine state. If the fourth criterion is satisfied, the lens movement state is in the coarse state, and the downhill count value DownCount and the mid state count value MidCount are set to zero. Otherwise, the next criterion is taken into consideration.

If DownCount is equal to 3 or more, it is deemed that the actual peak is found. Under this circumstance, the lens movement state is set to the mid state. If MidCount is larger than 3, the possibility of containing a peak gets smaller and the lens movement state is set to the coarse state.

The fifth criterion (Criterion 5) discriminates if the focus value difference $FV_{dif}$ is greater than or equal to zero.

If the fifth criterion is satisfied, the sixth criterion (Criterion 6) is further used to discriminate if $FV_{dif} > T_{dif} \times FV_{pre}$ and $FV_{cur} > FV_{max}$. If the sixth criterion is satisfied, the lens movement state is in the fine state, and the downhill count value DownCount is set to zero. Otherwise, the next criterion is taken into consideration. Normally, the sixth criterion takes effect during the peak in FV curve.

The seventh criterion (Criterion 7) discriminates if $FV_{dif} < T_{dif} \times FV_{pre}$ and the lens movement state is in the fine state. If the seventh criterion is satisfied, the lens movement state is set to the mid state, and the downhill count value DownCount is set to zero. Otherwise, the next criterion is taken into consideration.

The eighth criterion (Criterion 8) discriminates if $FV_{cur} < 0.9 \times FV_{max}$. If the eighth criterion is satisfied, the lens movement state is set to the mid state, and the downhill count value DownCount is set to zero. Otherwise, the lens movement state remains its current state.

The ninth criterion (Criterion 9) discriminates if $FV_{cur} > FV_{max}$. If the ninth criterion is satisfied, the mid state count value MidCount should add one.

If the fifth criterion is not satisfied, i.e. $FV_{dif}$ is less than zero, the tenth criterion (Criterion 10) is used to discriminate if the current state is the fine state. If the tenth criterion is satisfied, the lens movement state remains the fine state and the downhill count value DownCount should add one. Otherwise, the next criterion is taken into consideration.

The eleventh criterion (Criterion 11) discriminates if DownCount=3 or $FV_{cur} < 0.9 \times FV_{max}$. If the eleventh criterion is satisfied, the downhill count value DownCount is set to zero and the lens movement state is set to the mid state.

After the state is decided according to the above criteria, the lens moves in the state, and $FV_{pre}$ and $FV_{max}$ are updated. If the search range is finished, the maximum focus value $FV_{max}$ and its corresponding step position are found. After the lens moves to the right position with the maximum focus value $FV_{max}$, the auto focus process is finished.

Figure 4:
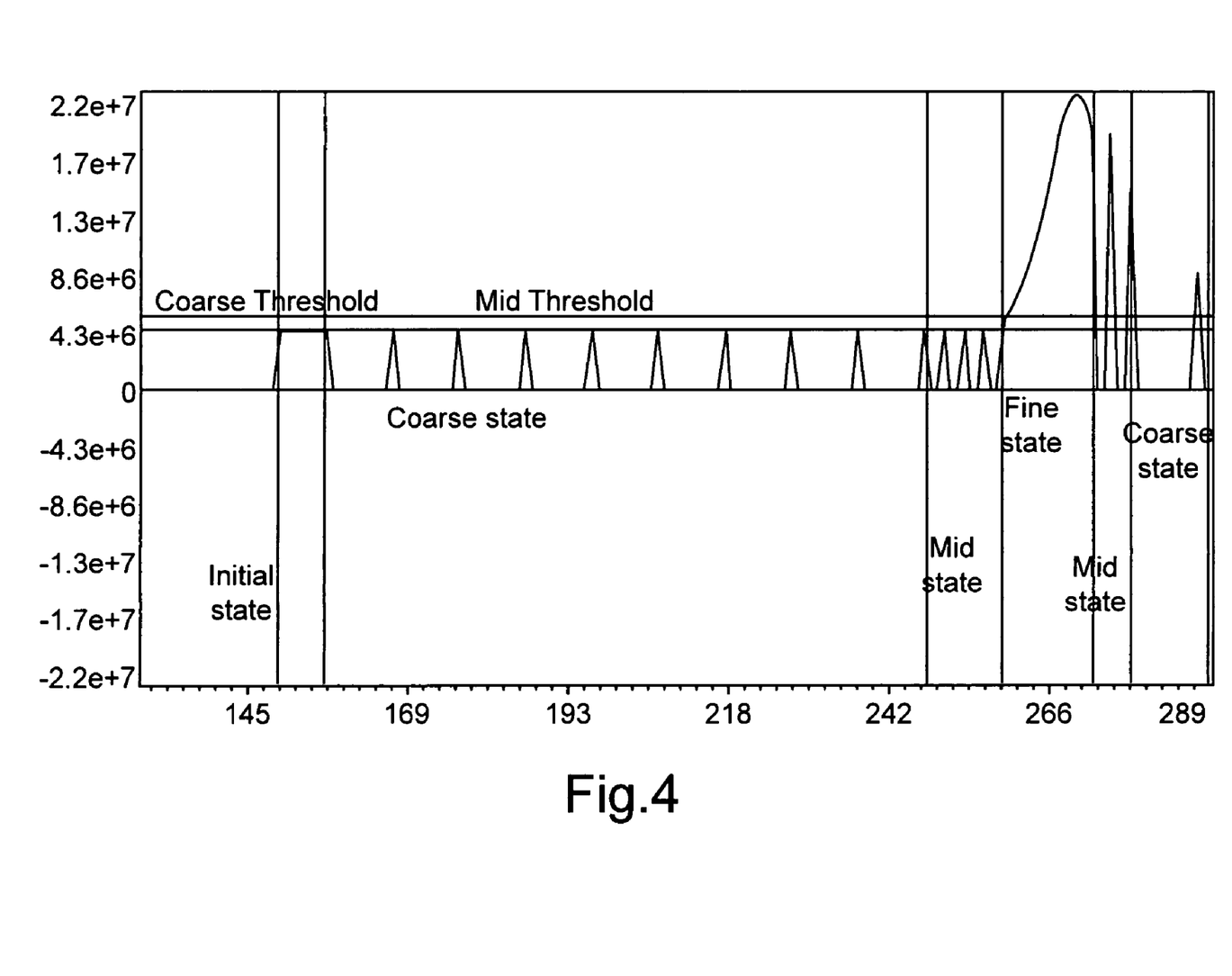
FIG. 4 is a curve plot illustrating the relation between focus value versus lens search steps according to the present invention.

FIG. 4 is a curve plot illustrating the relation between focus value versus lens search steps. The horizontal coordinate and the vertical coordinate denote the lens search steps and the focal length, respectively.

Hereinafter, with respect to a first image, the performance of using the auto focus method of the present invention and the conventional global search algorithm will be illustrated with reference to FIG. 5. The items for determining the performance include actual image, FV curve, total search iterations, total steps and search time. FIG. 5A1 illustrates the image focused by the present auto focus method. FIG. 5A2 indicates the FV curve of the present auto focus method. Whereas, FIGS. 5B1 and 5B2 illustrate the image focused by the global search algorithm and FV curve of the global search algorithm, respectively.

Figure 5:
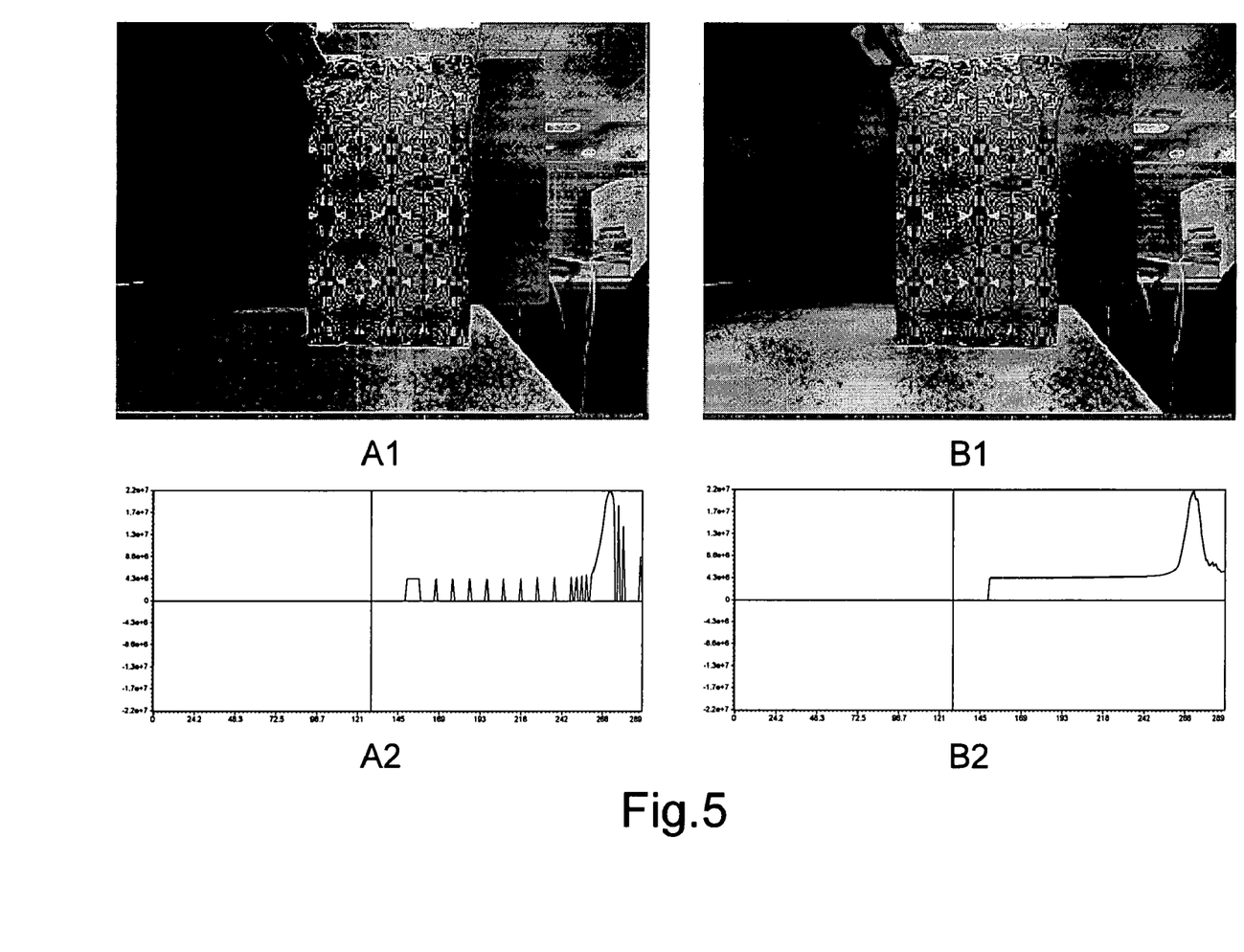
FIG. 5 illustrates the image and the FV curve of a first image by using the auto focus method of the present invention and the conventional global search algorithm.

As shown in FIGS. 5A1 and 5B1, the subject at the center of the image contains lots of high frequency components. In addition, the image shown in FIG. 5A1 is very similar to that shown in FIG. 5B1.

When the present auto focus method is implemented, the number of total search iterations is 37, the actual focus time is 1.5 second and the number of total move steps is 69. Whereas, by using the global search algorithm, the number of total search iterations is 140, the actual focus time is 4.9 second and the number of total move steps is 172.

With respect to a second image, the performance of using the auto focus method of the present invention and the conventional global search algorithm will be illustrated with reference to FIG. 6. FIG. 6A1 illustrates the image focused by the present auto focus method. FIG. 6A2 indicates the FV curve of the present auto focus method. Whereas, FIGS. 6B1 and 6B2 illustrate the image focused by the global search algorithm and FV curve of the global search algorithm, respectively.

Figure 6:
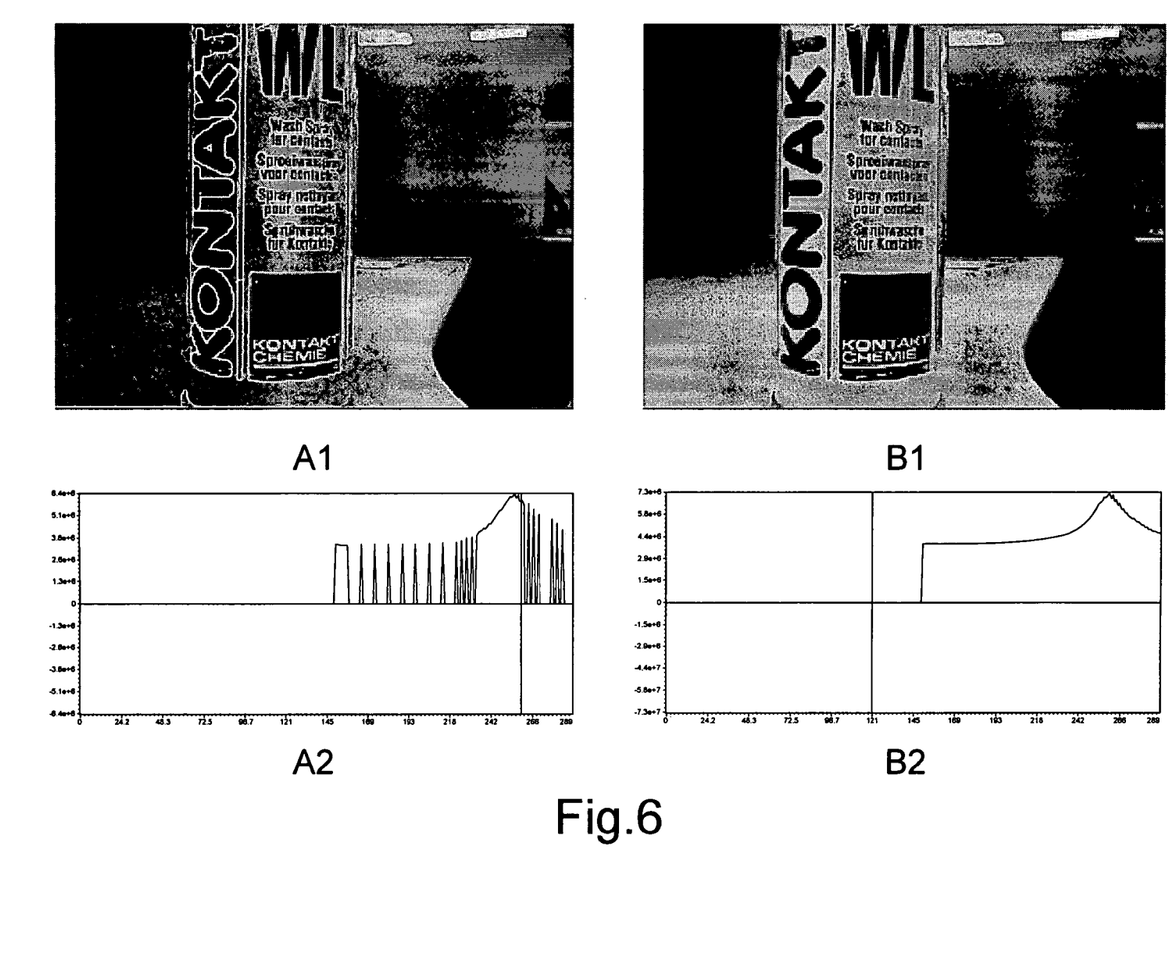
FIG. 6 illustrates the image and the FV curve of a second image by using the auto focus method of the present invention and the conventional global search algorithm.

The images shown in FIGS. 6A1 and 6B1 are very clear. As shown in FIG. 6A2, the first to the fifth steps are in the initial state, and then the coarse state is entered. Once the FV curve is going uphill, the state becomes the mid state. When the peak is approached, the fine state is set. Once the peak is found and starts downhill, the mid state is set, and the search process is finished in the coarse state.

When the present auto focus method is implemented, the number of total search iterations is 52, the actual focus time is 2.1 second and the number of total move steps is 84. Whereas, by using the global search algorithm, the number of total search iterations is 140, the actual focus time is 4.9 second and the number of total move steps is 172.

With respect to a third image, the performance of using the auto focus method of the present invention and the conventional global search algorithm will be illustrated with reference to FIG. 7. FIG. 7A1 illustrates the image focused by the present auto focus method. FIG. 7A2 indicates the FV curve of the present auto focus method. Whereas, FIGS. 7B1 and 7B2 illustrate the image focused by the global search algorithm and FV curve of the global search algorithm, respectively.

Figure 7:
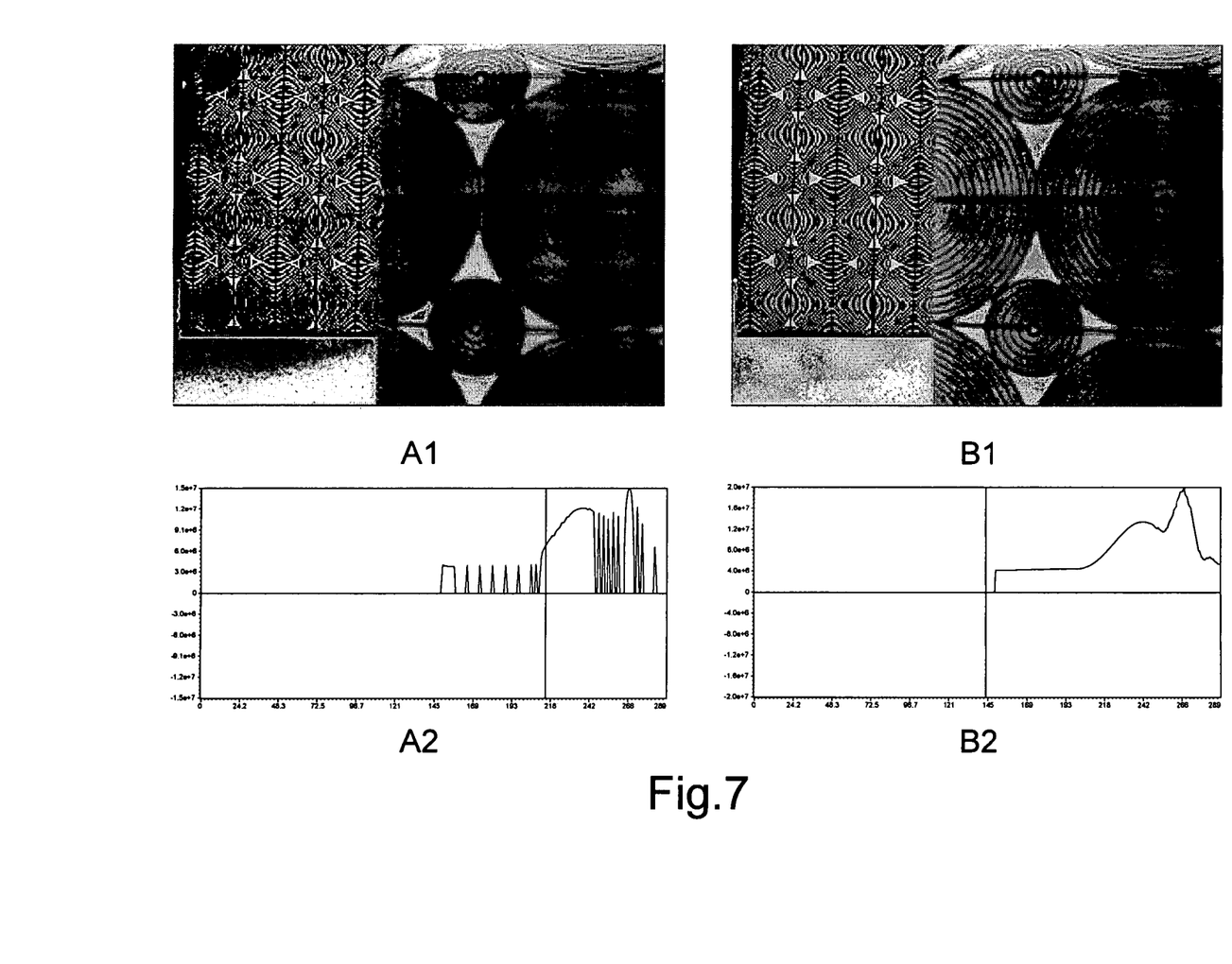
FIG. 7 illustrates the image and the FV curve of a third image by using the auto focus method of the present invention and the conventional global search algorithm.

The image shown in FIG. 7A1 or FIG. 7B1 has two main peaks. The smaller peak appears earlier than the larger one. As shown in FIG. 7A2, successively, the previous peak is firstly found, the FV curve goes downhill, and the mid state is entered and then switched to the fine state so as to further find another peak. From this image, it is demonstrated that the real peak can be found by using the auto focus method of the present invention even when there exists a local peak.

When the present auto focus method is implemented, the number of total search iterations is 58, the actual focus time is 2.4 second and the number of total move steps is 90. Whereas, by using the global search algorithm, the number of total search iterations is 140, the actual focus time is 4.9 second and the number of total move steps is 172.

With respect to a fourth image, the performance of using the auto focus method of the present invention and the conventional global search algorithm will be illustrated with reference to FIG. 8. FIG. 8A1 illustrates the image focused by the present auto focus method. FIG. 8A2 indicates the FV curve of the present auto focus method. Whereas, FIGS. 8B1 and 8B2 illustrate the image focused by the global search algorithm and FV curve of the global search algorithm, respectively.

Figure 8:
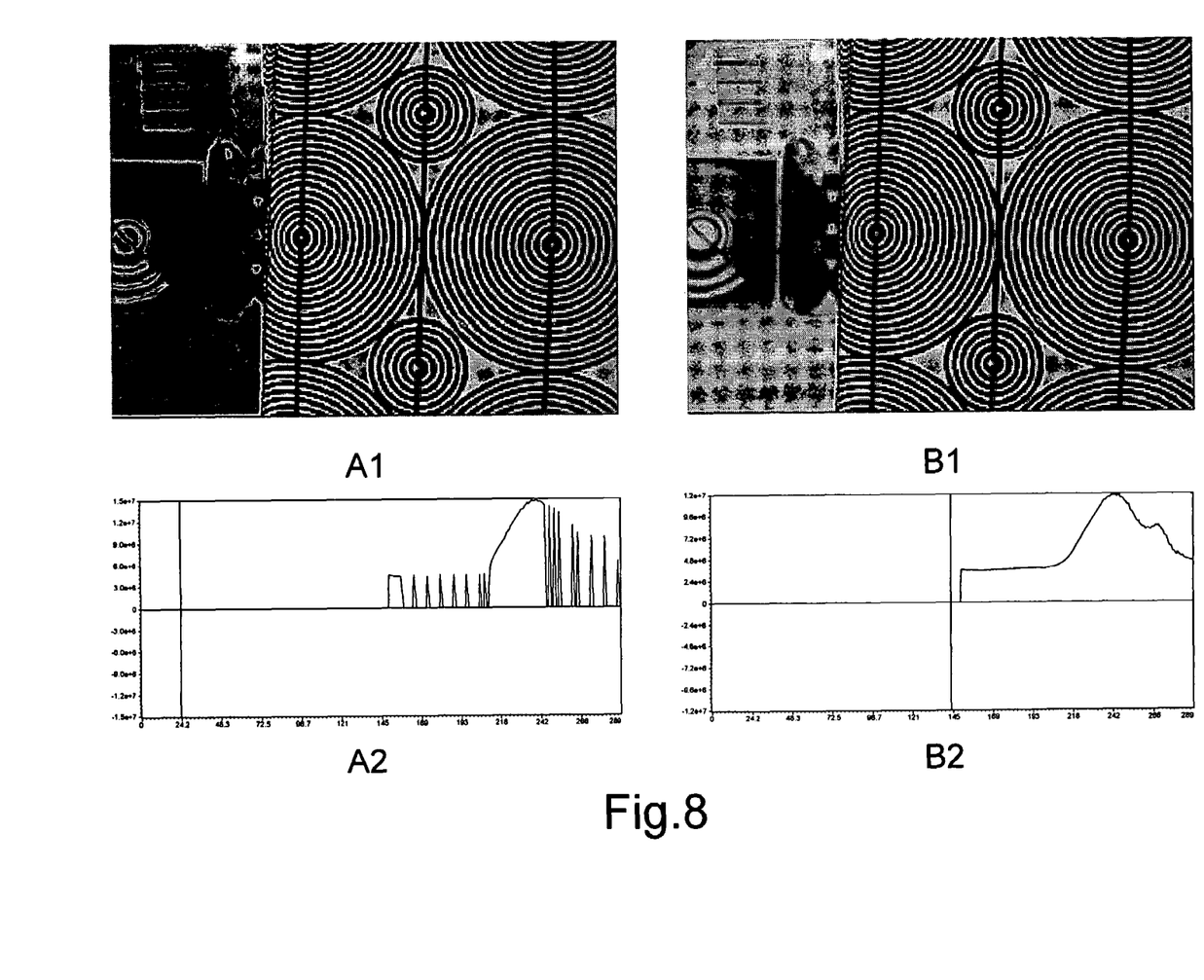
FIG. 8 illustrates the image and the FV curve of a fourth image by using the auto focus method of the present invention and the conventional global search algorithm.

The image shown in FIG. 8A1 or FIG. 8B1 has two main peaks. However, the larger peak appears earlier than the smaller one. As shown in FIG. 8A2, since the global peak is found earlier than the local peak, the local peak is searched simply in the coarse state rather than the fine state.

When the present auto focus method is implemented, the number of total search iterations is 54, the actual focus time is 2.3 second and the number of total move steps is 86. Whereas, by using the global search algorithm, the number of total search iterations is 140, the actual focus time is 4.9 second and the number of total move steps is 172.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An auto focus method of a digital camera for moving a lens of said digital camera to the maximum focus value position, comprising steps of:
   (a) calculating a focus value average $FV_{avg}$ of the focus values from the first step position to the Nth step position of said lens;
   (b) determining a lens movement state including a coarse state, a mid state and a fine state, wherein said lens moves A steps in said coarse state, B steps in said mid state and one step in said fine state, where B is less than A;
   (c) moving said lens and recording the focus value of said lens in said lens movement state according to said focus value average $FV_{avg}$, a focus value difference $FV_{dif}$, a previous maximum focus value $FV_{max}$, a coarse state threshold $T_c$, a mid state threshold $T_m$, a focus value difference threshold $T_{dif}$, a mid state count value MidCount and a downhill count value DownCount;
   (d) repeating steps (b) and (c) until the searching over a search range is finished; and
   (e) moving said lens to a right position corresponding to the maximum focus value.

2. The auto focus method of a digital camera according to claim 1 wherein N is equal to 5.

3. The auto focus method of a digital camera according to claim 1 wherein A is an integer from 8 to 12, and B is an integer from 3 to 5.

4. The auto focus method of a digital camera according to claim 1 wherein said coarse state threshold $T_c$ is between 1.05 and 1.15, said mid state threshold $T_m$ is between 1.1 and 1.2, and said focus value difference threshold $T_{dif}$ is between 0.015 and 0.025.

5. The auto focus method of a digital camera according to claim 1 wherein said lens movement state is set to said coarse state if $FV_{cur} < T_c \times FV_{avg}$ or $FV_{cur} < 0.7 \times FV_{max}$, where $FV_{cur}$ is a current focus value.

6. The auto focus method of a digital camera according to claim 5 wherein said lens movement state is set to said mid state and said downhill count value DownCount is set to zero if $T_c \times FV_{avg} < FV_{cur} < T_m \times FV_{avg}$ and $FV_{cur} > FV_{max}$.

7. The auto focus method of a digital camera according to claim 6 wherein said lens movement state is set to said coarse state and said downhill count value DownCount and said mid state count value MidCount are set to zero if $FV_{cur} < FV_{max}$, MidCount>3, DownCount is not equal to 3, and the current state is not the fine state.

8. The auto focus method of a digital camera according to claim 6 further comprising a step of discriminating if said focus value difference $FV_{dif}$ is greater than or equal to zero.

9. The auto focus method of a digital camera according to claim 8 wherein said lens movement state is set to said fine state and said downhill count value DownCount is set to zero if $FV_{dif} >= 0$, $FV_{dif} > T_{dif} \times FV_{pre}$ and $FV_{cur} > FV_{max}$.

10. The auto focus method of a digital camera according to claim 9 wherein said lens movement state is set to said mid state and said downhill count value DownCount is set to zero if $FV_{dif} < T_{dif} \times FV_{pre}$ and said lens movement state is in the fine state.

11. The auto focus method of a digital camera according to claim 10 wherein said lens movement state is set to said mid state and said downhill count value DownCount is set to zero if $FV_{cur} < 0.9 \times FV_{max}$, or otherwise said lens movement state remains its current state.

12. The auto focus method of a digital camera according to claim 10 wherein said mid state count value MidCount adds one if $FV_{cur} > FV_{max}$.

13. The auto focus method of a digital camera according to claim 8 wherein said lens movement state is set to said fine state and said downhill count value DownCount adds one if $FV_{dif} <$ zero.

14. The auto focus method of a digital camera according to claim 13 wherein said lens movement state is set to said mid state and said downhill count value DownCount is set to zero if DownCount=3 or $FV_{cur} < 0.9 \times FV_{max}$.

* * * * *